(12) United States Patent
Bayley

(10) Patent No.: US 6,775,252 B1
(45) Date of Patent: Aug. 10, 2004

(54) DYNAMIC ADJUSTMENT OF SEARCH WINDOW SIZE IN RESPONSE TO SIGNAL STRENGTH

(75) Inventor: Gwain Bayley, Carlsbad, CA (US)

(73) Assignee: Qualcomm, Inc., San Diego, CA (US)

(*) Notice: Subject to any disclaimer, the term of this patent is extended or adjusted under 35 U.S.C. 154(b) by 0 days.

(21) Appl. No.: 09/540,922

(22) Filed: Mar. 31, 2000

(51) Int. Cl.$^7$ .................................................. H04Q 7/00
(52) U.S. Cl. ................... 370/328; 370/342; 370/335; 370/479
(58) Field of Search ............................... 370/328, 329, 370/331, 332, 333, 479, 441, 342, 335, 320; 455/434, 437, 525, 67.11, 226.2

(56) References Cited

U.S. PATENT DOCUMENTS

| | | | | |
|---|---|---|---|---|
| 5,101,501 A | * | 3/1992 | Gilhousen et al. | 455/442 |
| 5,267,261 A | * | 11/1993 | Blakeney et al. | 370/332 |
| 5,577,022 A | * | 11/1996 | Padovani et al. | 370/332 |
| 5,627,835 A | * | 5/1997 | Witter | 370/320 |
| 5,644,591 A | * | 7/1997 | Sutton | 375/142 |
| 5,781,543 A | * | 7/1998 | Ault et al. | 370/342 |
| 5,790,589 A | * | 8/1998 | Hutchison et al. | 375/149 |
| 5,805,648 A | * | 9/1998 | Sutton | 375/367 |
| 5,848,063 A | * | 12/1998 | Weaver et al. | 370/331 |
| 5,872,774 A | * | 2/1999 | Wheatley et al. | 370/335 |
| 6,160,511 A | * | 12/2000 | Pfeil et al. | 342/457 |
| 6,191,738 B1 | * | 2/2001 | Pfeil et al. | 342/457 |
| 6,577,616 B1 | * | 6/2003 | Chaudry et al. | 370/342 |

FOREIGN PATENT DOCUMENTS

GB      2320655 A   *   6/1998   ............ H04Q/7/38

* cited by examiner

*Primary Examiner*—Wellington Chin
*Assistant Examiner*—Mark Mais
(74) *Attorney, Agent, or Firm*—Philip Wadsworth; Charles B. Brown; Howard H. Seo

(57) ABSTRACT

A method and apparatus of adjusting a search window size by a remote unit in a slotted mode wireless communication system. In a slotted mode communication system, the remote unit is in an "active state" during its assigned slot. While in the active state the controller in a remote unit passes selected sets of search parameters to a search engine. The search engine performs searches on base stations using the selected sets of search parameters. One search parameter, the search window size, is adjusted in response to a measured signal strength of a first base station signal. The adjusted search window size is used by the remote unit when searching other base stations.

18 Claims, 9 Drawing Sheets

DYNAMIC ADJUSTMENT OF SEARCH WINDOW SIZE IN RESPONSE TO SIGNAL STRENGTH

RELATED APPLICATIONS

The following U.S. Patent Applications filed concurrently herewith, are related to this application and are hereby incorporated by reference in their entirety: DECREASING SEARCH TIME BY DYNAMIC ADJUSTMENT OF NEIGHBORING BASE STATION INTEGRATION INTERVAL IN RESPONSE TO A PREFERRED BASE STATION PILOT SIGNAL STRENGTH, U.S. patent application Ser. No. 09/540,798; and PRIORITIZATION OF SEARCHING BY A REMOTE UNIT IN A WIRELESS COMMUNICATION SYSTEM, U.S. patent application Ser. No. 09/540,802.

FIELD OF THE INVENTION

The invention relates to wireless communications systems. In particular, the invention relates to dynamic adjustment of search window size used by a remote unit to search base stations, in response to a signal strength of a preferred base station, in a wireless communication system.

BACKGROUND OF THE INVENTION

A wireless communication system may comprise multiple remote units and multiple base stations. FIG. 1 exemplifies an embodiment of a terrestrial wireless communication system with three remote units 10A, 10B and 10C and two base stations 12. In FIG. 1, the three remote units are shown as a mobile telephone unit installed in a car 10A, a portable computer remote 10B, and a fixed location unit 10C such as might be found in a wireless local loop or meter reading system. Remote units may be any type of communication unit such as, for example, hand-held personal communication system units, portable data units such as a personal data assistant, or fixed location data units such as meter reading equipment. FIG. 1 shows a forward link 14 from the base station 12 to the remote units 10 and a reverse link 16 from the remote units 10 to the base stations 12.

Communication between remote units and base stations, over the wireless channel, can be accomplished using one of a variety of multiple access techniques which facilitate a large number of users in a limited frequency spectrum. These multiple access techniques include time division multiple access (TDMA), frequency division multiple access (FDMA), and code division multiple access (CDMA). An industry standard for CDMA is set forth in the TIA/EIA Interim Standard entitled "Mobile Station—Base Station Compatibility Standard for Dual-Mode Wideband Spread Spectrum Cellular System", TIA/EIA/IS-95, and its progeny (collectively referred to here as IS-95), the contents of which are incorporated by reference herein in their entirety. Additional information concerning a CDMA communication system is disclosed in U.S. Pat. No. 4,901,307, entitled SPREAD SPECTRUM MULTIPLE ACCESS COMMUNICATION SYSTEM USING SATELLITE OR TERRESTRIAL REPEATERS, (the '307 patent) assigned to the assignee of the present invention and incorporated in its entirety herein by reference.

In the '307 patent, a multiple access technique is disclosed where a large number of mobile telephone system users, each having a transceiver, communicate through base stations using CDMA spread spectrum communication signals. The CDMA modulation techniques disclosed in the '307 patent offer many advantages over other modulation techniques used in wireless communication systems such as TDMA and FDMA. For example, CDMA permits the frequency spectrum to be reused multiple times, thereby permitting an increase in system user capacity. Additionally, use of CDMA techniques permits the special problems of the terrestrial channel to be overcome by mitigation of the adverse effects of multipath, e.g. fading, while also exploiting the advantages thereof.

In a wireless communication system, a signal may travel several distinct propagation paths as it propagates between base stations and remote units. The multipath signal generated by the characteristics of the wireless channel presents a challenge to the communication system. One characteristic of a multipath channel is the time spread introduced in a signal that is transmitted through the channel. For example, if an ideal impulse is transmitted over a multipath channel, the received signal appears as a stream of pulses. Another characteristic of the multipath channel is that each path through the channel may cause a different attenuation factor. For example, if an ideal impulse is transmitted over a multipath channel, each pulse of the received stream of pulses generally has a different signal strength than other received pulses. Yet another characteristic of the multipath channel is that each path through the channel may cause a different phase on the signal. For example, if an ideal impulse is transmitted over a multipath channel, each pulse of the received stream of pulses generally has a different phase than other received pulses.

In the wireless channel, the multipath is created by reflection of the signal from obstacles in the environment such as, for example, buildings, trees, cars, and people. Accordingly, the wireless channel is generally a time varying multipath channel due to the relative motion of the structures that create the multipath. For example, if an ideal impulse is transmitted over the time varying multipath channel, the received stream of pulses changes in time delay, attenuation, and phase as a function of the time that the ideal impulse is transmitted.

The multipath characteristics of a channel can affect the signal received by the remote unit and result in, among other things, fading of the signal. Fading is the result of the phasing characteristics of the multipath channel. A fade occurs when multipath vectors add destructively, yielding a received signal that is smaller in amplitude than either individual vector. For example if a sine wave is transmitted through a multipath channel having two paths where the first path has an attenuation factor of X dB, a time delay of δ with a phase shift of Θ radians, and the second path has an attenuation factor of X dB, a time delay of δ with a phase shift of Θ+π radians, no signal is received at the output of the channel because the two signals, being equal amplitude and opposite phase, cancel each other. Thus, fading may have a severe negative effect on the performance of a wireless communication system.

A CDMA communication system is optimized for operation in a multipath environment. For example, the forward link and reverse link signals are modulated with a high frequency pseudonoise (PN) sequence. The PN modulation allows the many different multipath instances of the same signal to be separately received through the use of a "rake" receiver design. In a rake receiver, each element within a set of demodulation elements can be assigned to an individual multipath instance of a signal. The demodulated outputs of the demodulation elements are then combined to generate a combined signal. Thus, all of the multipath signal instances must fade together before the combined signal experiences a deep fade.

In a communication system based on the industry standard for CDMA, IS-95, each of the multiple base stations transmits a pilot signal having a common PN sequence. Each base station transmits the pilot signal offset in time from neighboring base stations so that the signals can be distinguished from one another at the remote unit. At any given time, the remote unit may receive a variety of pilot signals from multiple base stations. Using a copy of the PN sequence produced by a local PN generator, the entire PN space can be searched by the remote unit. Using the search results, the controller distinguishes pilot signals from multiple base stations based on the time offset.

In the remote unit, a controller is used to assign demodulation elements to the available multipath signal instances. A search engine is used to provide data to the controller concerning the multipath components of the received signal. The search engine measures the arrival time and amplitude of the multipath components of a pilot signal transmitted by the base stations. The effect of the multipath environment on the pilot signal and the data signal transmitted by a common base station is very similar because the signals travel through the same channel at the same time. Therefore, determining the multipath environment's affect on the pilot signal allows the controller to assign demodulation elements to the data channel multipath signal instances.

The search engine determines the multipath components of the pilot signals of base stations in the proximity of the remote unit by searching through a sequence of potential PN offsets and measuring the energy of the pilot signal received at each of the potential PN offsets. The controller evaluates the energy associated with a potential offset, and, if it exceeds a threshold, assigns a signal demodulation element to that offset. A method and apparatus of demodulation element assignment based on searcher energy levels is disclosed in U.S. Pat. No. 5,490,165 entitled DEMODULATION ELEMENT ASSIGNMENT IN A SYSTEM CAPABLE OF RECEIVING MULTIPLE SIGNALS, (the '165 patent) assigned to the assignee of the present invention.

FIG. 2 shows an exemplifying set of multipath signal instances of a single pilot signal from a base station arriving at a remote unit. The vertical axis represents the power received in decibels (dB). The horizontal axis represents the delay in the arrival time of a signal instance due to multipath delays. The axis (not shown) going into the page represents a segment of time. Each signal spike in the common plane of the page has arrived at the remote unit at a common time but has been transmitted by the base station at a different time. Each signal spike 22–27 has traveled a different path and therefore exhibits a different time delay, a different amplitude, and a different phase response. The six different signal spikes represented by spikes 22–27 are representative of a severe multipath environment. A typical urban environment produces fewer usable paths. The noise floor of the system is represented by the peaks and dips having lower energy levels. The task of the search engine is to identify the delay, as measured by the horizontal axis, and amplitude, as measured by the vertical axis, of signal spikes 22–27 for potential demodulation element assignment.

Note, as shown in FIG. 2, each of the multipath peaks varies in amplitude as a function of time as shown by the uneven ridge of each multipath peak. In the limited time shown, there are no major changes in the multipath peaks. Over a more extended time range, multipath peaks disappear and new paths are created as time progresses. Multipath peaks are likely to merge together or blur into a wide peak over time.

Typically, the operation of the search engine is overseen by a controller. The controller commands the search engine to step through a set of PN offsets, referred to as a search window, that is likely to contain one or more multipath signal peaks suitable for assignment to a demodulation element. For each offset, the search engine reports the energy it found offset back to the controller. Demodulation elements may then be assigned by the controller to the paths identified by the search engine (i.e. the timing reference of their PN generators is aligned with the timing of the identified path). Once a demodulation element has locked onto the signal, it then tracks that path on its own without controller supervision, until the path fades away or until the demodulation element is assigned to another path by the controller.

As noted above, each base station in a given geographical area is assigned a sequence offset of a common PN pilot sequence. For example, according to IS-95, a PN sequence having $2^{15}$ chips (i.e., one bit in the PN sequence) and repeating every 26.66 milliseconds (ms) is transmitted by each base station in the system at one of 512 PN sequence offsets as a pilot signal. According to IS-95 operation, the base stations continually transmit the pilot signal which can be used by the remote unit to identify the base station as well as other functions, such as for example, determining the multipath environment the remote unit is operating in and synchronization of remote unit timing to the base station timing.

During initial power on, or any other situation when the remote unit has lost a pilot signal such as when performing a hard hand-off to a different operating frequency, the remote unit evaluates all possible PN offsets of the pilot PN sequence. Typically, a search engine measures the pilot signal strength at all possible PN offsets, proceeding at a measurement rate that produces an accurate measure of the pilot signal present at the corresponding offset. Proceeding in this manner, the search engine determines the PN offset of base stations which are geographically near the remote unit. Searching each PN offset in this manner can take anywhere from hundreds of milliseconds to a few seconds depending on the channel conditions during acquisition. This amount of time for the remote unit to reacquire a pilot signal is detrimental to the remote unit operation, and may be annoying to the user of the remote unit.

FIG. 3 shows an extended portion of PN space on the horizontal axis. The groups of peaks 30, 32 and 34 represent transmissions from three different base stations. As shown, the signal from each base station signal experiences a different multipath environment. Also, each base station has a different PN offset from the PN reference 36. Thus, the controller may select a set of PN offsets corresponding to search windows for any of the identified base stations. This allows the remote unit to simultaneously demodulate signals from multiple base stations by assigning demodulation elements appropriately.

In a typical CDMA communication system, remote units sporadically establishes bi-directional communications with a base station. For example, a cellular telephone remains idle for significant periods of time when no call is in process. However, to ensure that any message directed to a remote unit is received, the remote unit continuously monitors the communication channel even while it is idle. For example, while idle, the remote unit monitors the forward link channel from the base station to detect incoming calls. During such idle periods, the cellular telephone continues to consume power to sustain the elements necessary to monitor for signals from the base stations. Many remote units are portable and are powered by an internal battery. For example, personal communication system (PCS) handsets are almost exclusively battery-powered. The consumption of battery resources by the remote unit in idle mode decreases the battery resources available to the remote unit when a call is placed or received. Therefore, it is desirable to minimize power consumption in a remote unit in the idle state and thereby increase battery life.

One means of reducing remote unit power consumption in a communication system is disclosed in U.S. Pat. No. 5,392,287, entitled APPARATUS AND METHOD FOR REDUCING POWER CONSUMPTION IN A MOBILE COMMUNICATION RECEIVER (the '287 patent), assigned to the assignee of the present invention and hereby incorporated in its entirety herein by reference. In the '287 patent, a technique for reducing power consumption in a remote unit operating in an idle mode (i.e. a remote unit which is not engaged in bi-directional communication with a base station) is disclosed. In idle, each remote unit periodically enters an "active" state during which it prepares to and receives messages on a forward link communication channel. In the time period between successive active states, the remote unit enters an "inactive" state. During the remote unit's inactive state, the base station does not send any messages to that remote unit, although it may send messages to other remote units in the system that are in the active state.

As disclosed in the '287 patent, a base station broadcast messages which are received by all remote units within the base station coverage area on a "paging channel." All idle remote units within the base station coverage area monitor the paging channel. The paging channel is divided in the time dimension into a continuous stream of "slots." Each remote unit operating in slotted mode monitors only specific slots which have been assigned to it as active (assigned) slots. The paging channel continually transmits messages in numbered slots, repeating the slot sequence, such as for example, every 640 slots. When a remote unit enters the coverage area of a base station, or if a remote unit is initially powered on, it communicates its presence to a preferred base station. Typically the preferred base station is the base station which has the strongest pilot signal as measured by the remote unit.

The preferred base station, along with a plurality of geographically near neighboring base stations, assign a slot, or a plurality of slots, within their respective paging channels, for the remote unit to monitor. The base station uses the slots in the paging channel to transmit control information to a remote unit, if necessary. The remote unit may also monitor a timing signal from the preferred base station allowing the remote unit to align, in the time dimension, to the base station slot timing. By aligning in the time dimension to the preferred base station slot timing, the remote unit can determine when a paging channel slot sequence begins. Thus, knowing when the paging channel slot sequence begins, which slots are assigned for it to monitor, the total number of slots in the repetitive paging channel sequence of slots, and the period of each slot, the remote unit is able to determine when its assigned slots occur.

Generally, the remote unit is in the inactive state while the base station is transmitting on the paging channel in slots which are not within the remote unit's assigned set. While in the inactive state, the remote unit does not monitor timing signals transmitted by the base station, maintaining slot timing using an internal clock source. Additionally, while in the inactive state the remote unit may remove power from selected circuitry, such as, for example, circuits which monitor pilot signals transmitted by base stations to detect changes in the wireless channel including the search engine. Using its internal timing, the remote unit transits to its active state a short period of time before the next occurrence of an assigned slot.

When transiting to the active state, the remote unit applies power to circuitry that monitors the wireless channel, including the search engine. The search engine is used to reacquire the preferred base station's pilot signal and to detect changes in the wireless channel which may have occurred due to the movement of the remote unit or to the movement of objects within the coverage area of the base station. In addition to reacquiring the pilot signal, the remote unit may perform any other actions or initializations in preparation of receiving a message at the beginning of its assigned slot.

When the remote unit enters the active state, it may receive messages in its assigned slots in the paging channel and respond to commands from the base station. For example, the remote unit may be commanded to activate a "traffic" channel to establish a bi-directional communication link for conducting subsequent voice communication in response to an incoming call. If there is no message from the base station, or no command requesting the remote unit to remain active, at the end of the assigned slot the remote unit returns to the inactive state. In addition, the remote unit returns to the inactive state immediately if commanded to do so by the base station.

During its assigned slot, the remote unit's search engine measures the pilot signal strengths of the preferred base station as well as the pilot signal strength of neighboring base stations. If the remote unit relocates from the coverage area of one base station to another neighboring base station's coverage area, the remote unit needs to "hand-off" to the neighboring base station. A hand-off occurs when the transmitted pilot signal strength of a neighbor base station becomes sufficiently stronger than the preferred base station. When this occurs, the neighboring base station is assigned as the preferred base station. Following a hand-off, in the next active state, the remote unit monitors the paging channel of the new preferred base station to receive messages and commands.

In addition to providing data for determining when a hand-off should occur, searches of the preferred base station's pilot signal allow the remote unit to make adjustments to compensate for changes in the multipath environment. For example, if one of the multipath signal instances weakens to the point that it is unusable, the remote unit may reassign demodulation elements accordingly.

Knowing the nominal PN offset of the preferred base station as well as a neighboring set of base stations, typically, the controller passes a set of search parameters to the search engine specifying PN offsets at which multipath signal instances of pilot signals are likely to be found. At the completion of the search, the search engine passes the search results to the controller. The controller analyzes the search results and selects a set of search parameters for the next search. Following selection of the new search parameters, the controller passes the parameters to the search engine and the search process is repeated. This process is repeated until the remote unit once again enters the inactive idle state.

Due to the limited period available for searching, it is desirable to decrease the time required to complete a search of any individual base station's pilot signal. By decreasing the time required for an individual search, more searches may be performed in a given period. Increasing the number of base stations searched provides a more robust wireless communication system, improving the remote unit's ability to monitor the multipath environment and to better determine when a handoff should occur.

Therefore, there is a need in the art for a method and apparatus to decrease the time required to complete a search of base station signals.

SUMMARY OF THE INVENTION

The invention addresses these and other needs by providing a system and method wherein a remote unit dynamically adjusts the portion of the PN space searched for signals of base stations. The remote unit adjusts the size of the portion of PN space searched in response to characteristics of a signal transmitted by a first base station and received by the remote unit.

In one aspect of the invention, the strength of a signal transmitted by a first base station is measured at the remote unit. Typically, an increase in the strength of the signal indicates that the remote unit is geographically nearer to the base station, and a decrease in signal strength indicates that the remote unit is geographically farther from the base station. The remote unit receives the signal transmitted by the base station and synchronizes its local timing to the earliest arriving multipath of that signal. All base stations are synchronized so that the PN offsets (e.g., delays) between signals transmitted by the various base stations remain aligned with respect to one another.

Thus, if the remote unit receives a strong signal from the first base station, there is a high probability the remote unit is geographically near the base station. In addition, because the remote unit timing is synchronized with the first base station, it is unlikely that energy from a second base station will be received earlier in time than the energy received from the first base station. Therefore, if the remote unit receives a strong signal from the first base station, a set of PN offsets, referred to as a search window, used to search for signals transmitted by a second base station, may be decreased in the direction ahead in time. In contrast, if the remote unit receives a weak signal from the first base station, there is a higher probability that the remote unit is geographically far from the base station, and there is a higher likelihood that energy from a second base station may be received nearer in time to the energy received from the first base station. Thus, a correspondingly larger search window, increased in the direction ahead in time, may be selected.

In another aspect, the search window size selected in response to the received signal strength may be used for a subset of the searches. A default search window size, selected by a base station and communicated to the remote unit, may be used for the remaining searches. For example, .the search window size communicated to the remote unit may be used during 4 out of 5 searches of a particular base station. A decreased search window, selected by the remote unit, may be used during the remaining 1 out of 5 searches. It is contemplated that other combinations of searches using differing search window sizes maybe performed by the remote unit.

In another aspect, the first base station is a preferred base station, and the second base station is a plurality of neighboring base station. In addition, the signals transmitted by the base stations and measured by the remote unit are pilot signals.

In yet another aspect, the distance between the first base station and the remote unit is estimated based on, such as for example, the Global Positioning System (GPS) or other known positioning systems that provide information sufficient to determine the distance. The remote unit may use this distance information in the selection of a search window size.

BRIEF DESCRIPTION OF THE DRAWING

The features, objects and advantages of the present invention will become more apparent from the detailed description set forth below when taken in conjunction with the drawings in which like references characters identify correspondingly throughout. and wherein.

DETAILED DESCRIPTION OF THE INVENTION

Figure 1:
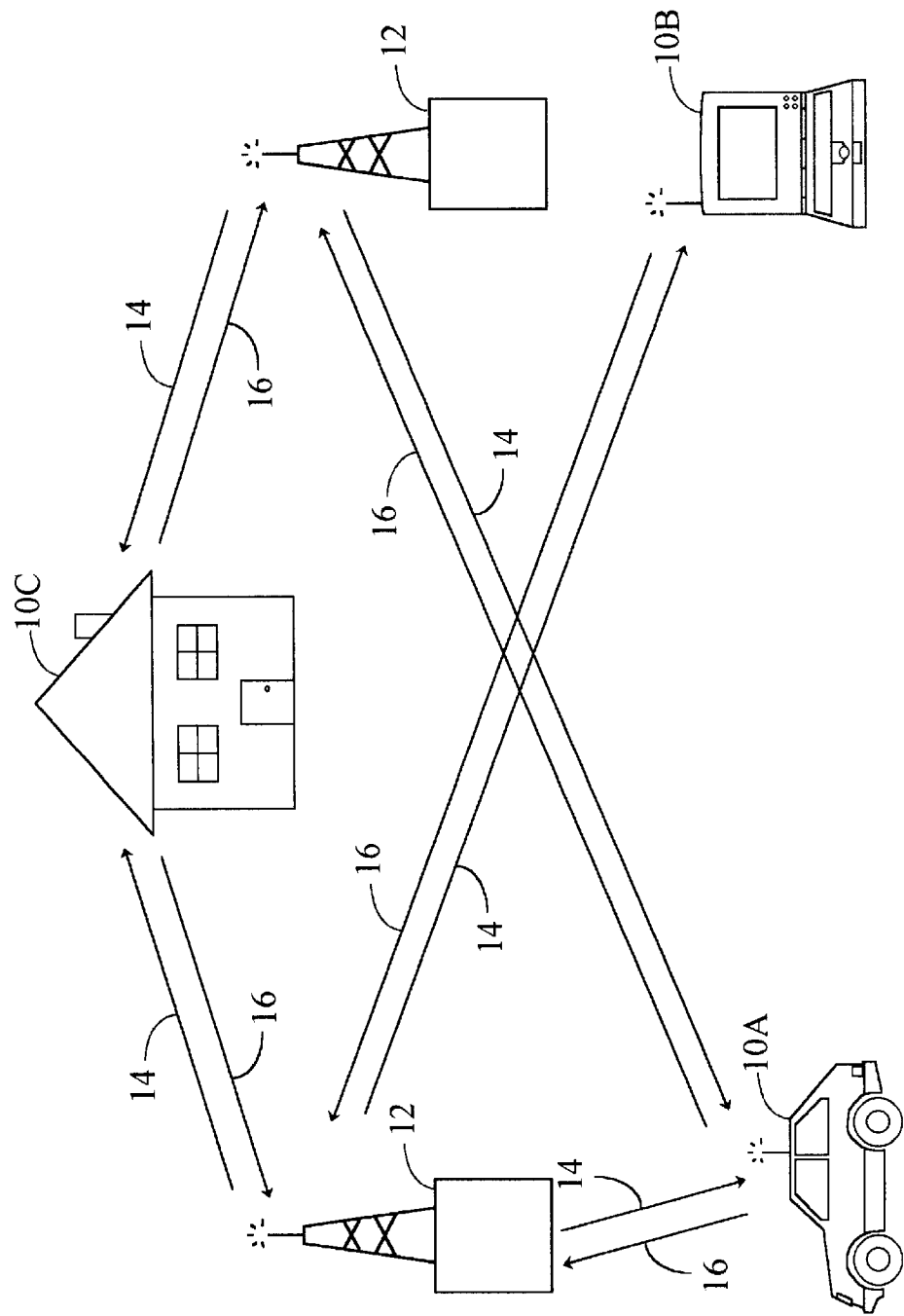
FIG. 1 is a representative diagram showing a typical modem wireless communication system.
Figure 2:
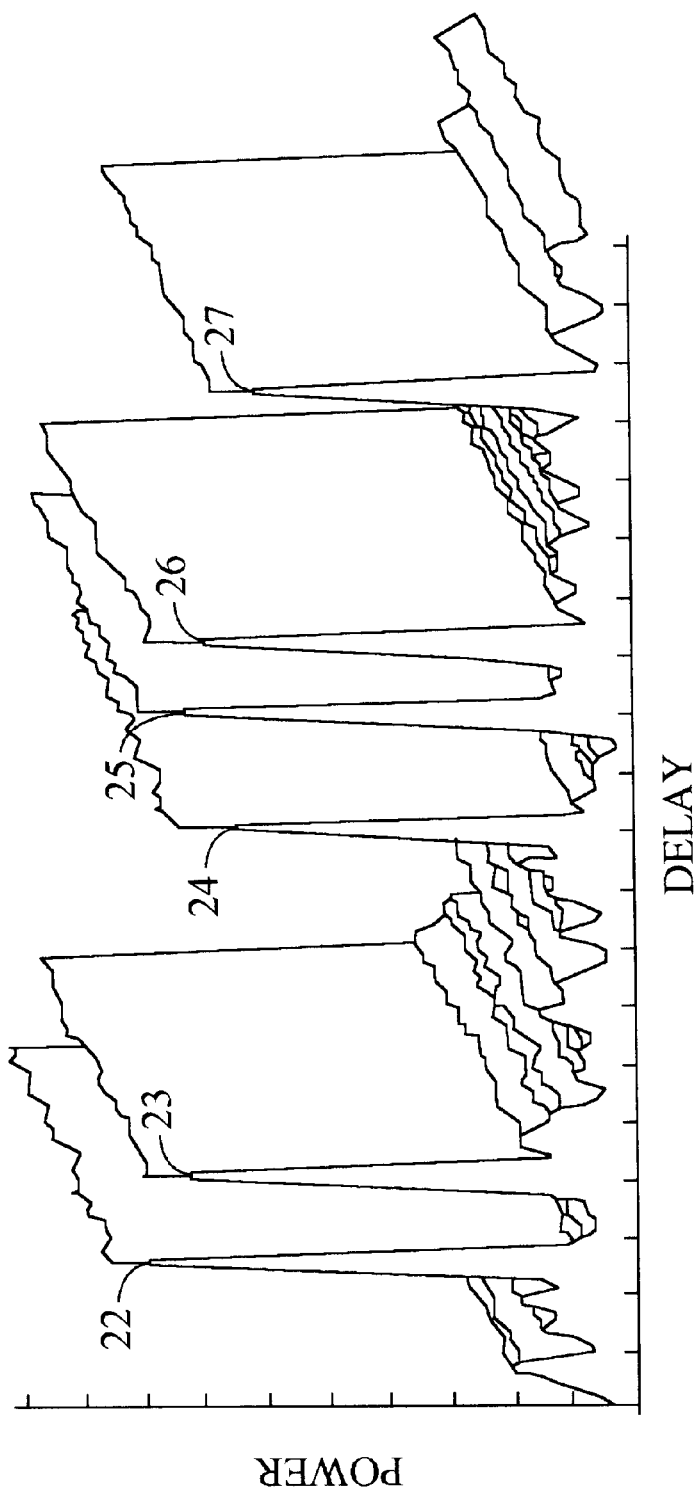
FIG. 2 is a graph showing an exemplifying set of multiple signal instances of a pilot signal from a single base station arriving at a remote unit.
Figure 3:
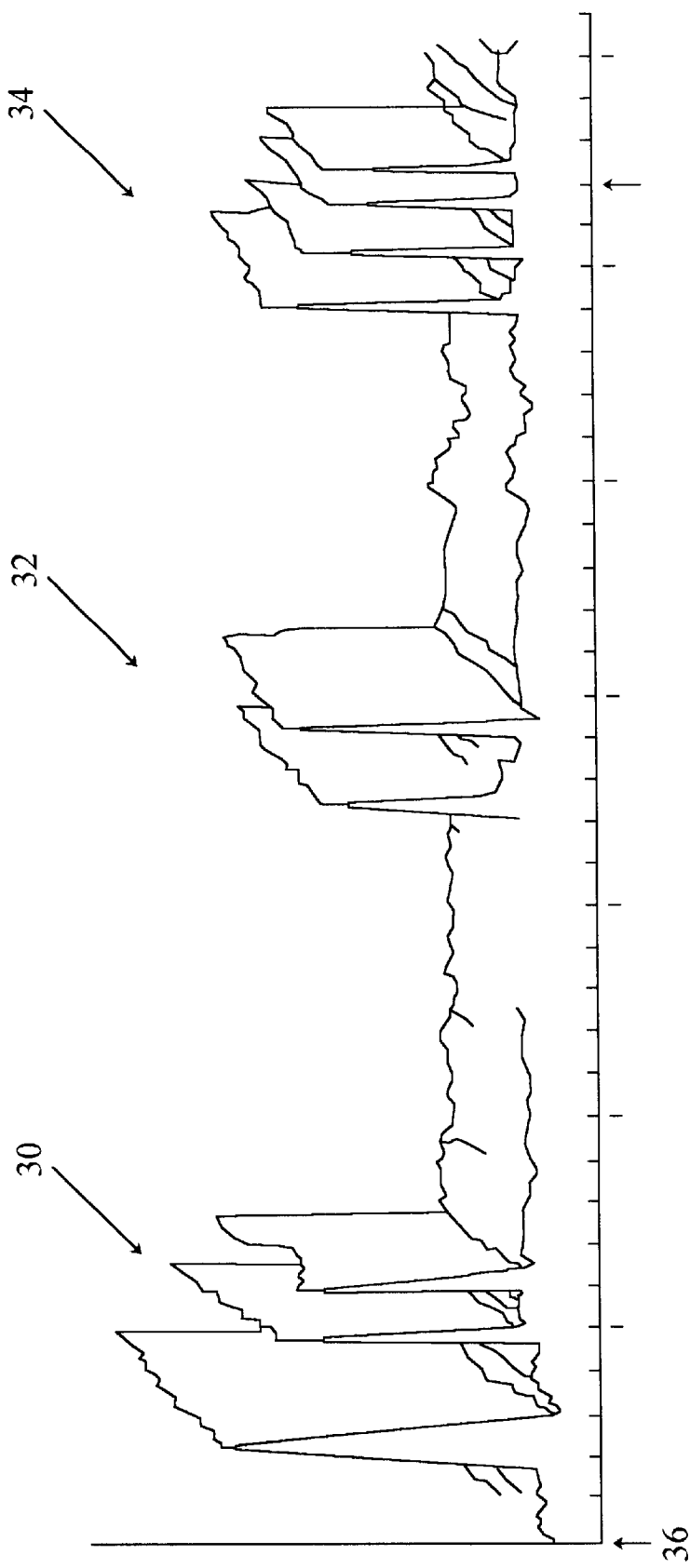
FIG. 3 is a graph showing an exemplifying set of multiple signal instances of pilot signals from multiple base stations arriving at a remote unit.
Figure 4:
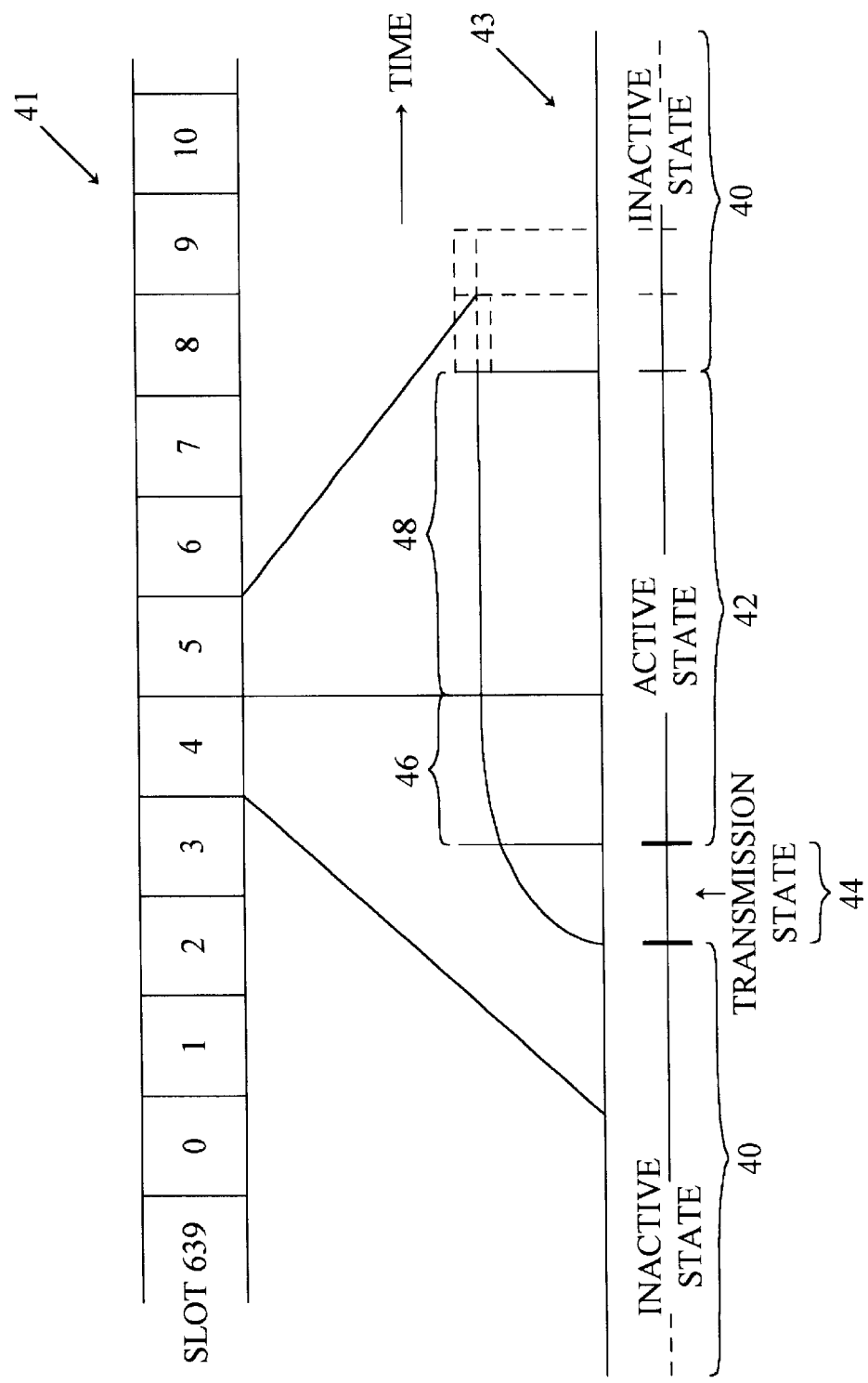
FIG. 4 is a representative diagram illustrating the transition from the inactive state to the active state at the assigned slot of a remote unit in a slotted mode communication system.

FIG. 4 is a representative diagram illustrating the transition from the inactive state to the active state at the assigned slot of a remote unit in a slotted mode communication system. An upper potion 41 represents a continual sequence of slots which flow in time from left to right. The lower portion 42 represents events occurring during a transition between active and inactive states of a remote unit in a slotted mode communication system in which slot 5 is an assigned slot. The time scale for the lower portion has been expanded so that the transition can be shown in more detail.

In particular, the lower portion 43 of FIG. 4 shows the transition from an inactive state 40 to an active state 42. In the active state 42, the remote unit monitors the base station signal during at least a portion of slot 5. Prior to the start of slot 5, the remote unit transits from the inactive state 40 to the active state 42 through a transition state 44. As described above, in the inactive state 40, selected circuitry in the remote unit is unpowered, reducing power consumption and extending battery life of the remote unit. For example, power may be removed from the search engine during the inactive state 40.

During the transition state 44, power is reapplied to the selected circuitry of the remote unit. For example, if the search engine is unpowered, power is reapplied in the transition state 44. The duration of the transition state 44 is sufficient to allow the remote unit to power on circuits and initialize functions so that the remote unit is functional, allowing it to perform searches at the end of the transition state 44.

Following the transition state 44, the remote unit enters the active state 42. The active state 42 is made up of two parts: a preparation period 46 and an assigned slot period 48. During the preparation period 46, an initial search is performed reacquiring the pilot signal of the preferred base station so that the remote unit is prepared to monitor the paging channel during the assigned slot period 48. The assigned slot period 48 begins at the beginning of slot 5.

During the assigned slot period 48, the remote unit receives messages on the paging channel from the preferred base station. Nominally, at the completion of slot 5, the assigned slot period 48 and the active state 42 terminate and the remote unit enters the inactive state 40. In order to further reduce the power consumption of the remote unit, the base station may command the remote unit to enter the inactive state 40 before the completion of slot 5. Alternatively, if the base station cannot complete the transfer of messages during slot 5, the base station may command the remote unit to remain in the assigned slot period 48 after the completion of the slot 5. Subsequently, the base station commands the remote unit to enter the inactive state 40. Searching terminates upon entering the inactive state 40 and power can then be removed from the search engine.

Figure 5:
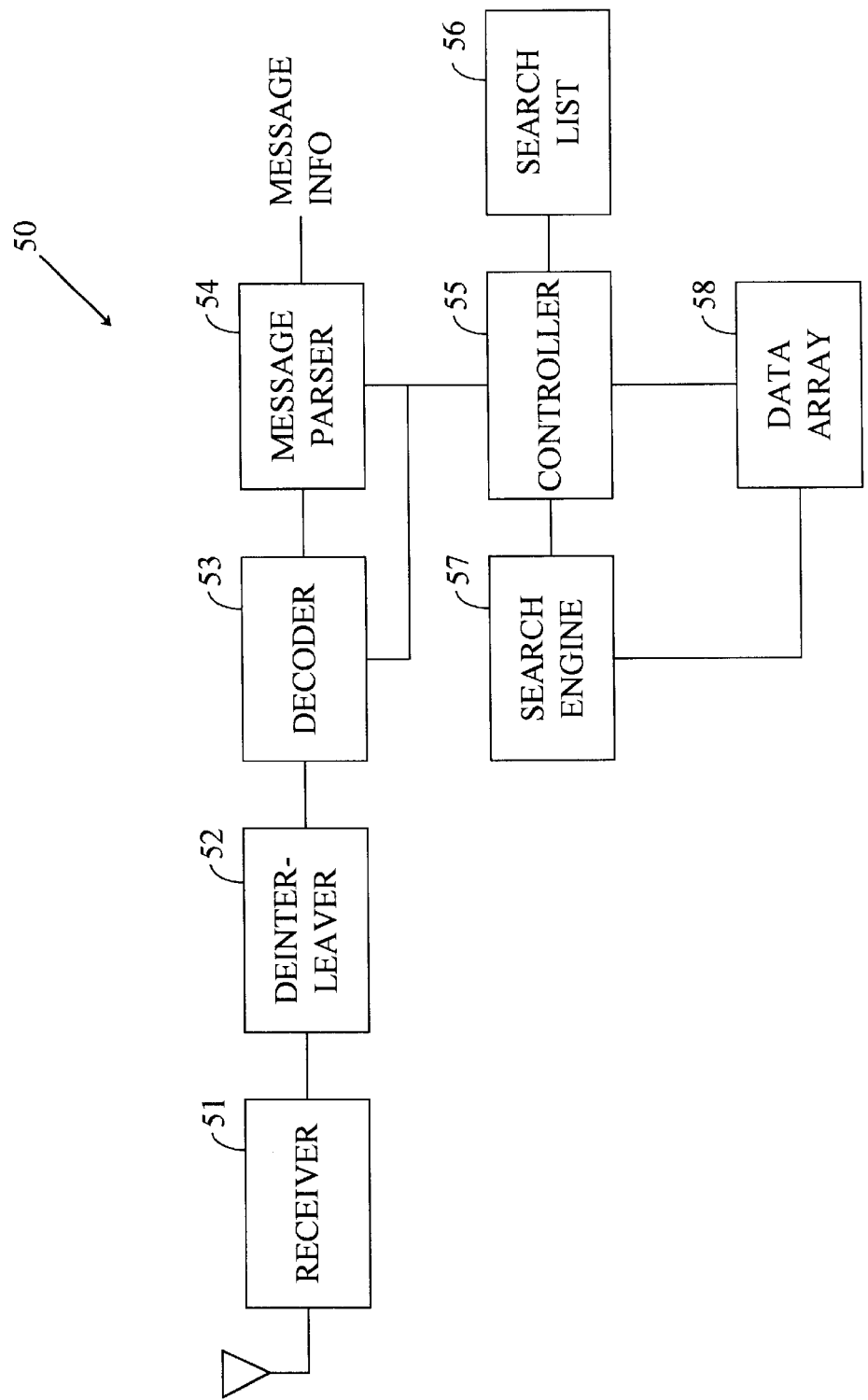
FIG. 5 is a block diagram of an embodiment of a remote unit.

FIG. 5 is a block diagram showing a portion of a remote unit 50. A receiver 51 receives wireless link signals. The receiver 51 provides for reception and down-conversion of the wireless link signal and also provides despreading in a CDMA environment, as well as other demodulation functions. The receiver 51 provides a series of digital values at its output.

According to well-known wireless link protocols, such as IS-95, before data is transmitted over the wireless link, it is divided into a series of blocks. The blocks are reordered in time such that the block order is non-time sequential as transmitted over the wireless link. This method of transmitting blocks is referred to as interleaving, and the process of reordering the blocks is referred to as deinterleaving. A deinterleaver 52 performs the deinterleaving function. The deinterleaver 52 receives samples from the receiver 51 and accumulates a series of blocks data. When an entire set of blocks has been received, the deinterleaver 52 reorders the blocks in time-sequential order and outputs them to a decoder 53.

In one embodiment, the decoder 53 is a convolutional decoder. One common form of convolutional decoders is the Virterbi decoder. A Virterbi decoder creates soft decision data based upon groups of data. When the decoder buffer contains sufficient data, the data is passed to a message parser 54. The message parser 54 performs such functions as collection of bits in the message, computing and verifying any cyclic redundancy code (CRC) or other error checking code, translation of the message into an internal format, copying the transformed message into a buffer, and placement of the transformed message onto a queue for the proper protocol task. The message is evaluated field-by-field. In general, the processes of the decoder 53 and the message parser 54 are controlled by a controller 55.

The controller 55 is also in communication with a search list 56 stored in memory, such as for example, a RAM or a portion of an Application Specific Integrated Circuit (ASIC) or other suitable electronic storage. In addition, the controller 55 is in communication with a search engine 57 so as to pass search parameters to the search engine 57. The search engine 57 is in communication with a data array 58 so as to store search results in the data array 58. The controller 55 is also in communication with the data array 58, thereby providing the controller 55 access to the search results stored therein. In one embodiment, the controller 55 is a microprocessor. In other embodiments, the controller 55 may be an ASIC, a Field Programmable Gate Array (FPGA), discrete logic, analog circuitry, or other control circuitry. In another embodiment, both the controller 55 and search engine 57 can be fabricated on the same ASIC. Additionally, the search list 56 and data array 58 can be included on the same or a different ASIC. In other embodiments, the configuration of the hardware in the remote unit 50 may be controlled through firmware, allowing field upgrade of a remote unit by downloading new firmware.

In general, operation of the remote unit 50 is controlled by configuration of the hardware and software executed on the controller 55. The hardware configuration may be established by firmware, software, hardwiring of discrete devices or any combination of the above.

When the remote unit 50 is initially powered on, no entries are in the search list 56. The remote unit 50 can perform searches in accordance with the technique disclosed in the above-referenced U.S. patent application Ser. No. 09/540,128 entitled FAST ACQUISITION OF A PILOT SIGNAL IN A WIRELESS COMMUNICATION DEVICE, or other well known techniques, to evaluate pilot signal strength. At the completion of searching, the search results are stored in the data array 58.

After the remote unit 50 has reacquired the preferred base station signal according to well-know techniques, the base station transmits nominal PN offsets for neighboring base stations to the remote unit 50 according to IS-95. The remote unit 50, using these offsets, searches for pilot signals of the neighboring base stations and measures the strength of their pilot signals. The controller 55 builds the search list 56 comprising the neighboring base station identification, measured pilot signal strength and measurement time. During subsequent searching by the remote unit 50, entries in the search list 56 are updated. Thus, the search list 56 contains the most recent measured pilot signal strengths of neighboring base stations and an indication of when the measurement was made.

In one embodiment, the remote unit 50 begins general searching for pilot signals from neighboring base stations only after entering the assigned slot period 48 depicted in FIG. 4. In another embodiment, general searching for pilot signals from neighboring base stations begins while the remote unit is still in the preparation period 46, immediately following reacquisition and alignment with the preferred base station. During general searching, the remote unit can continue to measure the pilot signal strength of the preferred base station.

Figure 6:
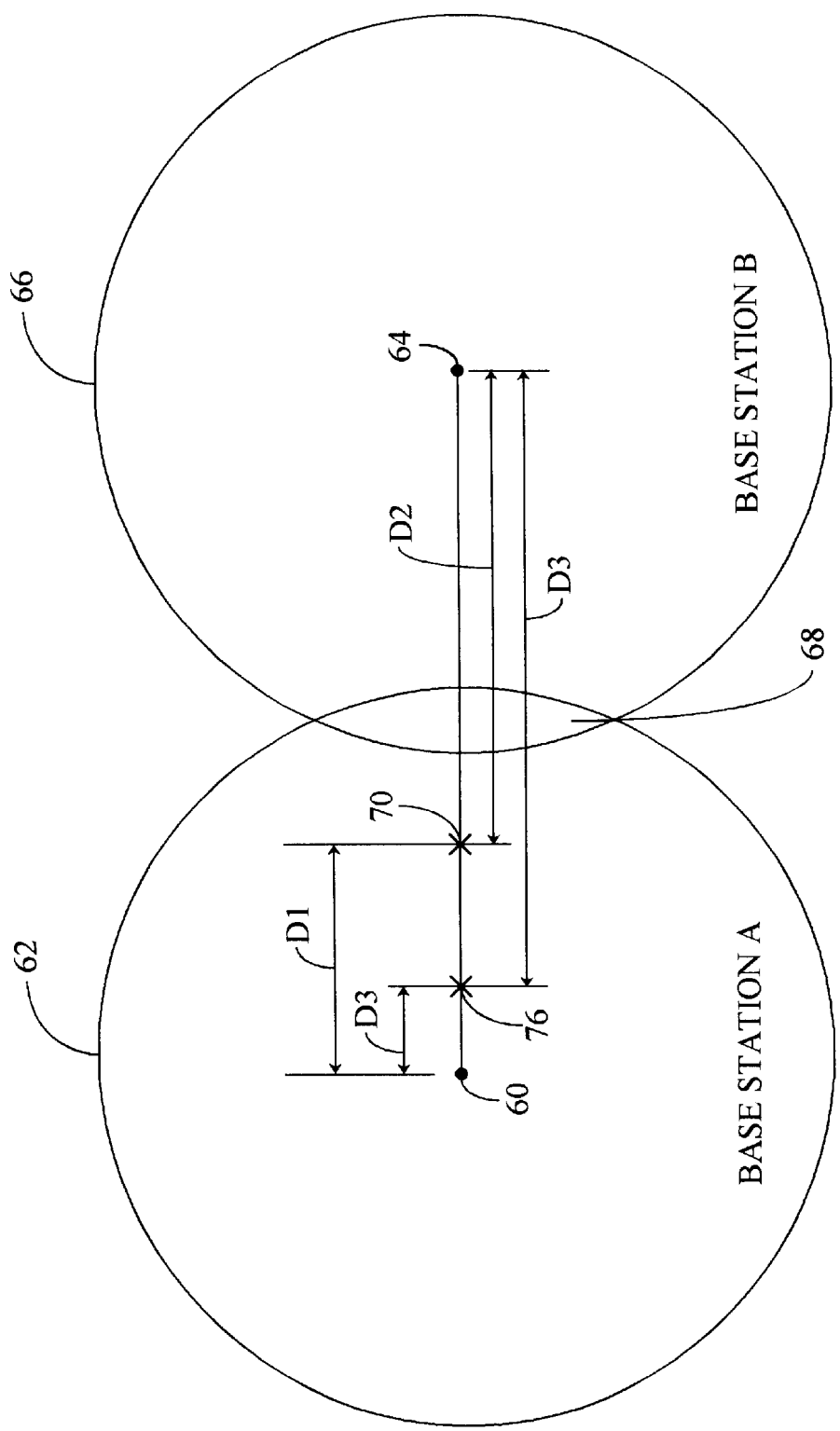
FIG. 6 is a representative diagram illustrating two base station coverage areas and a remote unit.

FIG. 6 is a diagram illustrating two base station coverage areas and illustrates several characteristics of a signal, transmitted by a base station and received by a remote unit, in relation to the location of the remote unit and the base station. A first base station 60 has a primary coverage area represented by circular region 62. A second base station 64 has a primary coverage area represented by circular region 66. The primary coverage region of a base station in an actual system is typically not circular, rather the shape is irregular due to the physical environment surrounding the base station. However, the circular geometry is convenient for discussing various aspects of the invention.

As illustrated in FIG. 6, the primary coverage area of the two base stations 60 and 64 overlap in a common region 68.

A remote unit that transits from the primary coverage area for the first base station 60 to the primary coverage area of the second base station 64 performs a handoff as it transits through the common region 68.

A remote unit at a first location 70 is within the primary coverage area of the first base station 60. Therefore, the remote unit assigns base station 60 as its preferred base station. A minimum distance traveled by a signal transmitted from base station 60 to remote unit at location 70 is indicated by distance D1. A remote unit at the first location 70 also receives signals from the second base station 64. The minimum distance traveled by signals transmitted from the second base station 64 to the remote unit at the first location 70 is indicated by distance D2. If the remote unit relocates to a second position 76, it will be nearer to the preferred base station 60 and farther from the second base station 64. With the remote unit at the second location 76, the minimum distance traveled by a signal transmitted from the preferred base station 60 to the remote unit is indicated by distance D3 which is less than distance D1. The distance a signal transmitted from the second base station 64 to the remote unit at location 76 is indicated by distance D4.

In general, the remote unit receives a variety of signals from the base station due to the multiple path nature of the terrestrial environment as described above. Although the remote unit may receive signals which have traveled a longer path than the minimum distances, the remote unit never receives a signal which has traveled a shorter distance than the minimum distance.

Figure 7:
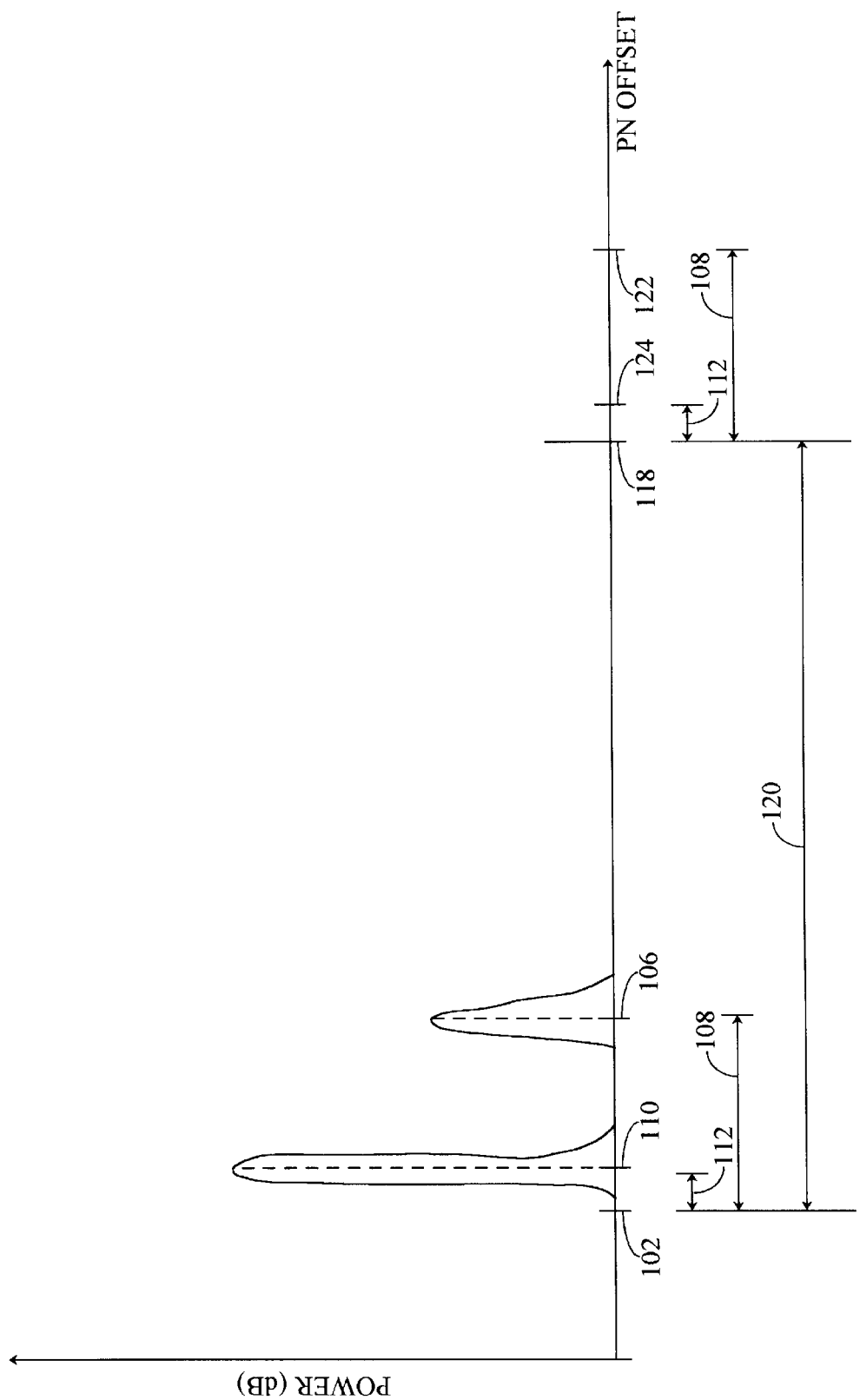
FIG. 7 is a graph showing exemplifying pilot signals from the two base stations illustrated in FIG. 6 arriving at a remote unit.

FIG. 7 is a graph illustrating signals received from the two base stations 60, 64, arriving at the remote unit as illustrated in FIG. 6. The horizontal axis represents PN offset, or delay, in the arrival time of signals from two base stations in units of PN chips. The vertical axis represents power received in decibels (dB). The actual pilot signal transmission time of the preferred base station 60 is PN offset 102. When the remote unit is at the first location 70, it receives the transmitted signal from the preferred base station 60 at a PN offset 106. The PN offset 106 is delayed from the actual base station offset 102 by a delay 108. The minimum value of the delay 108 of the first multipath instance is determined by the distance D1 over which the signal has to travel from the preferred base station 60 to the remote unit at the first location 70.

When the remote unit relocates to the second location 76, it receives the transmitted signal from the preferred base station 60 at a PN offset 110. The PN offset 110 of the first multipath instance is delayed from the actual base station offset 102 by a delay 112. The minimum value of the delay 112 is determined by the distance D3 over which the signal has to travel from the preferred base station 60 to the remote unit at the second location 76.

In general, a signal is attenuated to a greater degree as the distance over which it travels increases. This increased attenuation is illustrated in FIG. 7. As illustrated in FIG. 7, in general, as the distance between the preferred base station 60 and the remote unit decreases, the signal received by the remote unit increases in amplitude and decreases in delay from the actual transmission time of the base station.

The remote unit cannot accurately determine the value of the delay 108 and the delay 112. However, based upon the amplitude of the received signal, the remote unit can estimate when the delay is fairly short. The operation of one embodiment of the invention is based upon such an estimation.

In FIG. 7, the actual pilot signal transmission time of the second base station 64 is at a PN offset 118. Because the base stations are synchronized to one another, the PN offset between the preferred base station and the second base station is constant as represented by the PN offset illustrated by a fixed PN offset 120. Thus, the second base station always transmits its pilot signal delayed by the constant PN offset 120 from the pilot signal transmitted by the first base station.

The remote unit estimates the nominal, relative PN offset of the neighboring base station pilot signal relative to the arrival time of the preferred base station pilot signal using the nominal PN offset 120. The estimated arrival time of the second base station 64 pilot signal is delayed from its actual transmission time by the same amount as the preferred base station 60 arrival time is delayed from its actual transmission time. As illustrated in FIG. 7, when the remote unit is at the first location 70, the pilot signal of the preferred base station 60 arrives at PN offset 106, delayed in time from its actual transmission time at PN offset 102. Thus, the remote unit estimates the arrival of the pilot signal from the second base station 64 to occur at its nominal PN offset, represented by 120, after the arrival of the preferred base station pilot signal. This process results in the remote unit estimating the arrival time of the pilot signal of the second base station to occur at a PN offset 122. The estimated arrival PN offset 122 is delayed in time from the actual pilot signal transmission PN offset 118 by the delay of PN offset 108.

When the remote unit moves to the second location 76, the actual pilot signal arrival time of the preferred base station 60 at the remote unit is at PN offset 110. The remote unit once again estimates the arrival time of the pilot signal from the second base station 64 relative to the PN offset 110 at which the preferred base station signal is detected. This process results in the remote unit estimating the arrival time of the pilot signal of the second base station 64 to occur at a PN offset 124. The estimated arrival PN offset 124 is delayed in time from the actual pilot signal transmission PN offset 118 by the delay of PN offset 112.

When the remote unit is geographically near the preferred base station, the pilot signal of the preferred base station is generally subjected to less attenuation due to the relatively short distance the signal travels, as illustrated by comparing the power received at the PN offset 110 to the power received at the PN offset 106 in FIG. 7. In addition, the pilot signal experiences less delay before being received at the remote unit. Due to this decreased delay, the time difference between the time when the preferred base station actually transmits its pilot signal and the time when the pilot signal arrives at the remote unit is also fairly small.

As discussed above, the second base station pilot signal typically does not arrive exactly at the estimated time. Due to the distances the pilot signal travels and the multipath environment, the pilot signal may arrive sooner or later than the estimated time. However, the soonest the second base station 64 plot signal can arrive at the remote unit is the time at which the second base station 64 actually transmits the pilot signal, i.e., at PN offset 118. Because the neighboring base station pilot signal cannot possibly arrive before its actual transmission time, if the delay between the estimated arrival time and the actual transmission time is small, the size of a search window, a set of PN offsets, can be limited to exclude PN offsets which are earlier in time than PN offset 118.

The ability to limit the search window size is illustrated by comparison of the estimated arrival time of the pilot signal of the second base station for the two locations of the remote unit discussed above, as illustrated in FIG. 7. As discussed above, when the remote unit is at the first location 70, the estimated arrival time of the pilot signal is at PN offset 122. When the remote unit moves to the second location 76, which is closer to the preferred base station, the estimated arrival time of the pilot signal of the second base station is PN offset 124. Comparison of the two estimated arrival times illustrates that the PN offset 124 is a better estimate of the actual transmission offset 118 than the PN offset 122. In each case, the earliest PN offset at which the pilot signal of the second base station can arrive at the remote unit is the actual transmission time, PN offset 118.

However, because other factors can affect the received pilot signal strength of the preferred base station, such as for example, noise or interference, the ability to decrease a search window size may be limited. Thus, in one embodiment, the search window size selected based on received pilot signal strength may be used for a subset of searches. A default search window size, selected by a base station and communicated to the remote unit, and may be used for the remaining searches. For example, the search window size communicated to the remote unit may be used during 4 out of 5 searches of a particular base station. A decreased search window, selected by the remote unit, may be used during the remaining 1 out of 5 searches. In addition, other combinations of searches using differing search window sizes maybe performed by the remote unit.

Figure 7A:
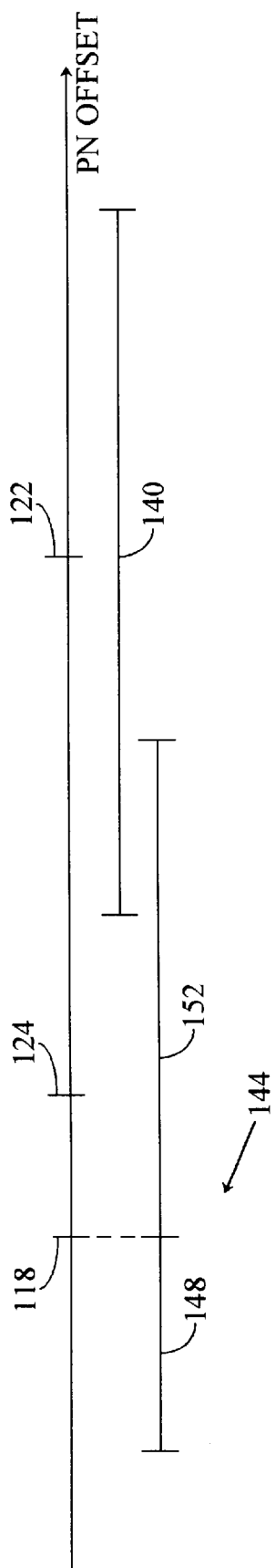
FIG. 7A is a graph showing an expanded view of the pilot signal of the second base station as received by the remote unit.

FIG. 7A is an expanded view of the PN offset region of FIG. 7, in the vicinity of the actual transmission time of the second base station pilot signal (PN offset 118). A typical search window in a remote unit is 121 chips wide centered about the estimated arrival PN offset. This window size results in searching 60 chips before and 60 chips after the estimated arrival offset of the pilot signal. A search window 121 chips wide centered about the estimated PN offset 122 is illustrated by a search window 140. A search window 121 chips wide centered about the estimated PN offset 124 is illustrated by a search window 144. As shown in FIG. 7A, a portion of the search window 144 may occur before the actual transmission of the second base station pilot signal at PN offset 118. A region 148 of the search window 144 occurring before the actual transmission of the second base station pilot signal PN offset 118 does not need to be searched because the pilot signal of the second base station cannot be received before it is transmitted. Searching only a region 152 of the search window 144 obtains the same search results as searching the entire search window 144. Therefore, the remote unit may limit the search window to exclude at least a portion of the region 148. Just as the remote unit cannot accurately predict the delays 108 and 112, it cannot predict accurately the exact size of the region 148. However, the remote unit can estimate the size of the region 148 based upon, for example, the amplitude of the signal received from the preferred base station.

Although the amplitude of the signal received from the preferred base station may be affected by factors other than distance, such as for example, noise or interference, it may indicate the distance between the remote unit and the preferred base station. Factors besides distance that may cause variations in the amplitude of the signal strengths may not allow all searches to be performed using a limited search window. However, as discussed above, a subset of searches may be able to use the limited search window and still achieve adequate search results.

As discussed above, the size of the search window may be limited when the delay between the transmission of a signal from the base station and receipt of that signal by the remote unit decreases. To determine if the search window can be reduced in size, the remote unit can evaluate the strength of the pilot signal received from the preferred base station 60. As illustrated in FIG. 7, when the remote unit is at the second location 76, nearer to the preferred base station 60, the strength of the received pilot signal increases in comparison with the signal strength received at the first location 70. As discussed above, the increase in signal strength may be due to less attenuation of the pilot signal because it travels a shorter distance. Therefore, it may be presumed that a stronger pilot signal is an indication that the remote unit may be nearer to the preferred base station. The smaller the difference between the actual transmission time and the arrival time of the preferred base station produces an estimated arrival time of the pilot signal from the second base station that is nearer the actual transmission time of the second base station. Accordingly, the search window may be reduced in size.

As discussed above the portion of PN space (search window) searched for signals from a second base station may be adjusted when the delay between transmission of a pilot signal, or other signal, by a first base station and receipt of the signal by the remote unit changes. For example, as the delay decreases, the search window size may be decreased because the remote unit is able to more accurately predict the transmission time of a signal by a second base station. In contrast, as the delay increases, the search window size is increased correspondingly because there is an increased uncertainty in the accuracy of predicting the transmission time of a signal by a second base station.

In general, a decrease in delay between a signal transmission by a first base station and reception of the signal by the remote unit corresponds to a decrease in distance between the first base station and the remote unit. In one embodiment, the first base station is a preferred base station and the second base station is a plurality of neighboring base stations. The distance between the preferred base station and the remote unit is estimated based on the strength of the signal received by the remote unit. In other embodiments, the distance between the preferred base station and the remote unit can be estimated based on, such as for example, the Global Positioning System (GPS) or know other positioning systems which provide information sufficient to determine distance.

In one embodiment the search window is one of two sizes. One search window is centered about the estimated arrival offset of the pilot signal of the second base station 64. If the received pilot signal strength of the preferred base station 60 exceeds a threshold, a second search window specifying a smaller PN offset range is used by the remote unit. The second search window is not centered about the estimated arrival time of the pilot signal, but rather is biased so that a greater range of offsets are searched corresponding to later arriving offsets than the estimated arrival time. For example, the first search window 140 may be 121 chips in duration, centered such that 60 chips before and 60 chips after the estimated arrival offset are searched. The second search window 144 may be 81 chips in duration, centered such that 20 chips before the estimated PN offset and 60 chips after the nominal PN offset are searched. The sizes, and biases, of the search windows in the above examples are purely illustrative. It would be apparent to one of ordinary skill in the art that the use of other sizes of search windows would be without departing from the spirit of the invention. In general, the search window size and biases can be varied corresponding to how accurately the remote unit is capable of determining its position in relationship to the preferred base station.

In another embodiment there are a series of thresholds and corresponding search windows. As the signal strength of the pilot signal of the preferred base station exceeds each of a series of thresholds, a correspondingly more limited search window is used. As the pilot signal strength decreases, dropping below one or more of a series of thresholds, a correspondingly expanded search window is selected. If the pilot signal strength drops below a minimum threshold, a default search window centered about the estimated arrival time is selected. The default search window size may be selected by a base station and communicated to the remote unit.

In yet another embodiment, the search window size is continuously or variably adjusted as the received pilot signal strength of the preferred base station varies between an upper and lower threshold. For example, as the pilot signal strength of the preferred base station increases and exceeds the upper threshold, a minimum search window size is selected even if the signal strength continues to increase. If the pilot signal strength drops below the lower threshold, a maximum search window size is selected even if the signal strength continues to decrease. Between these two thresholds, the search window size is varied inverse to the pilot signal strength of the preferred base station.

In another embodiment, the search window size selected in response to the received signal strength may be used for a subset of the searches. A default search window size, selected by a base station and communicated to the remote unit, may be used for the remaining searches. For example, the search window size communicated to the remote unit may be used during 4 out of 5 searches of a particular base station. A decreased search window, selected by the remote unit, may be used during the remaining 1 out of 5 searches. It is contemplated that other combinations of searches using differing search window sizes maybe performed by the remote unit.

Figure 8:
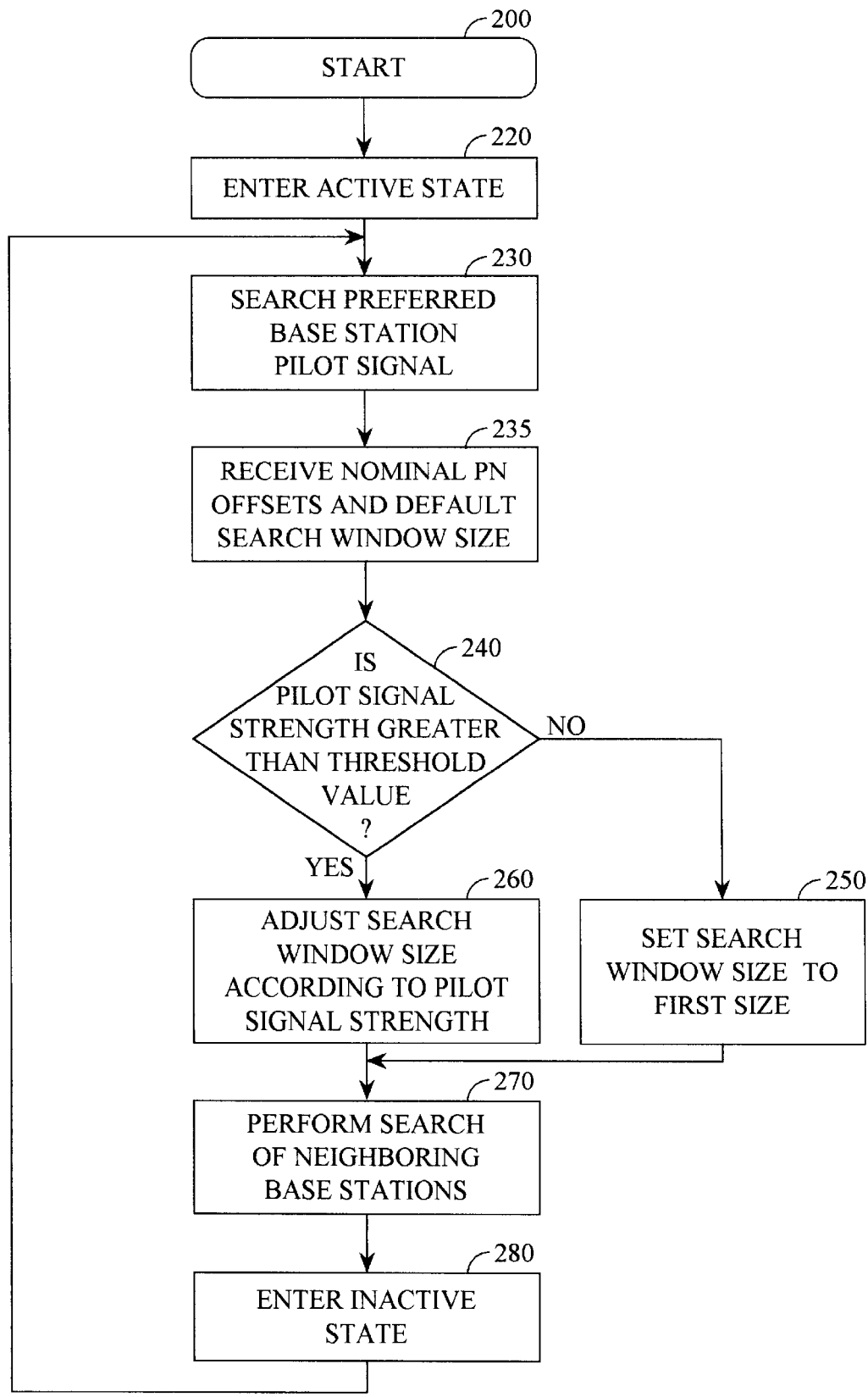
FIG. 8 is a flow chart illustrating sizing of the neighboring base station search window.

FIG. 8 is a flowchart illustrating one embodiment of the invention which adjusts the size of the search window in relation to the received signal strength of the pilot signal of the preferred base station. The process represented in FIG. 8 can be implemented in the remote unit depicted in FIG. 5 under the control of software or firmware, for example, running on the controller. Flow begins in block 200. Flow then continues to block 220. In block 220, the remote unit enters its active state. During the transition between its inactive and active states, the remote unit applies power to selected circuitry, such as, for example, the search engine. Flow then continues to block 230. In block 230, the remote unit performs a search, reacquiring and measuring the signal strength of the pilot signal of the preferred base station. Flow then continues to block 235 and the remote unit receives nominal PN offset information corresponding to neighboring base stations and a default search window size from the preferred base station. Flow continues to block 240.

In block 240, the preferred base station pilot signal level is examined to determine if it exceeds a threshold. If the pilot signal level does not exceed a threshold, flow continues to block 250. In block 250, the search window size is set to a first size. Flow then continues to block 270. Returning to block 240, if the pilot signal strength exceeds a threshold level, flow continues to block 260. In block 260, the size of the search window is adjusted in relation to the preferred base station pilot signal strength. As discussed above, in one embodiment, the search window size is selected from one of two sizes depending if the pilot signal strength exceeds the threshold. Thus, in FIG. 8, in block 260 a second search window size is selected. In another embodiment the search window size is selected from a set of search windows that decrease and increase in size as the pilot signal strength increases and decreases respectively. In yet another embodiment, the search window size is continuously adjusted in response to the pilot signal strength. After adjustment of the search window size, flow continues to block 270.

In block 270, searches are performed for the neighboring base station pilot signals utilizing the search windows. The search window used to search base stations may be the search window selected by the base station and communicated to the remote unit, or a size determined in either block 250 or 260. In addition, the search window size selected in either block 250 or 260 may be used for a subset of searches. For example, the search window size communicated to the remote unit may be used during 4 out of 5 searches of a particular base station. A decreased search window, selected by the remote unit, may be used during the remaining 1 out of 5 searches. Other combinations of searches using differing search window sizes maybe performed by the remote unit.

Searching continues in block 270 until the remote unit is either commanded to re-enter the inactive state by the preferred base station or the end of the assigned slot occurs. Flow then continues to block 280. In block 280, the remote unit enters an inactive state. The remote unit remains in the inactive state until the next active state occurs, at which time flow continues to block 220.

Although the embodiments discussed describe the invention as used relative to a pilot signal of a preferred base station in a wireless communication system, it would be readily apparent to one of ordinary skill in the art that the techniques disclosed also be applicable to any system which monitors multiple sources that are synchronized to each other. For example, the techniques can be used with data signals or internet traffic transmitted from multiple sources, such as, for example, low orbiting satellites.

More information concerning the searching process, demodulating element assignment and search engines can be found in:

(1) U.S. Pat. No. 5,644,591, entitled METHOD AND APPARATUS FOR PERFORMING SEARCH ACQUISITION IN A CDMA COMMUNICATIONS SYSTEM;

(2) U.S. Pat. No. 5,805,648, entitled METHOD AND APPARATUS FOR PERFORMING SEARCH ACQUISITION IN A CDMA COMMUNICATIONS SYSTEM;

(3) U.S. Pat. Nos. 5,867,527 and 5,710,768, entitled METHOD OF SEARCHING FOR A BURSTY SIGNAL;

(4) U.S. Pat. No. 5,764,687, entitled MOBILE DEMODULATOR ARCHITECTURE FOR A SPREAD SPECTRUM MULTIPLE ACCESS COMMUNICATION SYSTEM;

(5) U.S. Pat. No. 5,577,022, entitled PILOT SIGNAL SEARCHING TECHNIQUE FOR A CELLULAR COMMUNICATIONS SYSTEM;

(6) U.S. Pat. No. 5,654,979, entitled CELL SITE DEMODULATION ARCHITECTURE FOR A SPREAD SPECTRUM MULTIPLE ACCESS COMMUNICATION SYSTEMS;

(7) application Ser. No. 08/987,172, entitled MULTI CHANNEL DEMODULATOR, filed on Dec. 9, 1997; and (8) application Ser. No. 09/283,010, entitled PROGRAMMABLE MATCHED FILTER SEARCHER, filed on Mar. 31, 1999;

each of which is assigned to the assignee hereof and incorporated herein by reference, in its entirety.

The foregoing description details certain embodiments of the invention. It will be appreciated, however, that no matter how detailed the foregoing appears, the invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A method for determining a size of a search window, the method comprising:

measuring a strength of a PN encoded signal transmitted by a preferred base station;

selecting the size of the search window based on said strength of said PN encoded signal; and searching for a PN encoded signal transmitted by a neighboring base station by using the search window.

2. The method of claim 1 wherein said search window size is selected to adjust the search window size earlier in time from a predicted arrival time of the neighboring base station.

3. The method of claim 1 wherein if said strength of said PN encoded signal transmitted by said preferred base station is below a threshold a first search window size is selected, and if said strength of said PN encoded signal transmitted by a preferred base station is equal to or exceeds said threshold, a second search window size is selected.

4. The method of claim 1 wherein there is a plurality of thresholds and said search window size is changed each time said strength of said PN encoded signal transmitted by said preferred base station crosses a threshold.

5. The method of claim 1 wherein the selected size of the search window is used to search a plurality of neighboring base stations.

6. The method of claim 1 further comprising:

determining a delay between the transmission of a signal from the preferred base station and the reception of said signal by a remote unit.

7. The method of claim 6 further comprising:

decreasing the size of said search window if said delay decreases; and increasing the size of said search window if said delay increases.

8. The method of claim 1, wherein the PN encoded signal is a pilot signal.

9. The method of claim 1, wherein the size of the search window is based on a PN offset used for the search window.

10. A remote unit means for measuring a strength of a PN encoded signal transmitted by a preferred base station;

means for selecting a size of a search window in response to said strength of said PN encoded signal; and means for searching for a PN encoded signal transmitted by a neighboring base station by using the search window.

11. The remote unit of claim 10 wherein if said strength of said PN encoded signal transmitted by said preferred base station is below a threshold a first search window size is selected, and if said strength of said PN encoded signal transmitted by a preferred base station is equal to or exceeds said threshold, a second search window size is selected.

12. The remote unit of claim 10 wherein there is a plurality of thresholds and said search window size is changed each time said strength of said PN encoded signal transmitted by said preferred base station crosses a threshold.

13. The remote unit of claim 10 wherein the selected size of the search window is used to search a plurality of neighboring base stations.

14. The remote unit of claim 10 wherein said set of PN offsets is selected to be twenty chips earlier in time from the reference time to sixty chips later in time than the reference time.

15. A remote unit for use in a wireless communication system comprising:

a search engine configured to determine a signal strength of a signal received from a preferred base station and perform searches for a signal transmitted by a neighboring base station; and a controller in communication with said search engine configured to pass selected search parameters to the search engine, receive search result, evaluate said determined signal strength of said received signal, and determine a size of a search window to be used to search for the signal transmitted by the neighboring base station.

16. The remote unit of claim 15 wherein said controller is further configured such that if said determined signal strength is below a threshold level a first size of said search window is selected, and if said determined signal strength is equal to or exceeds said threshold level a second size of said search window is selected.

17. The remote unit of claim 15 wherein said controller is further configured such that there are a plurality of thresholds and a size of said search window is changed each time said determined signal strength crosses one of said threshold levels.

18. The remote unit of claim 15 wherein:

a default size of the search window is communicated to said remote unit by the preferred base station; and said controller uses said default size of the search window for some searches for signals transmitted by a base station.

* * * * *